(12) United States Patent  
Smith et al.

(10) Patent No.: US 9,250,120 B2  
(45) Date of Patent: Feb. 2, 2016

(54) FIBER-OPTIC MONITORING CABLE

(75) Inventors: Russell James Smith, Southampton (GB); Andrew Strong, Romsey (GB); Gareth P Lees, Hampshire (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 89 days.

(21) Appl. No.: 14/127,170

(22) PCT Filed: Jun. 25, 2012

(86) PCT No.: PCT/US2012/043939  
§ 371 (c)(1),  
(2), (4) Date: May 15, 2014

(87) PCT Pub. No.: WO2012/178143  
PCT Pub. Date: Dec. 27, 2012

(65) Prior Publication Data  
US 2014/0312215 A1 Oct. 23, 2014

Related U.S. Application Data

(60) Provisional application No. 61/500,639, filed on Jun. 24, 2011.

(51) Int. Cl.  
*G01J 1/04* (2006.01)  
*G01K 11/32* (2006.01)  
*G01L 1/24* (2006.01)  
*G01B 11/16* (2006.01)

(52) U.S. Cl.  
CPC .............. *G01J 1/0425* (2013.01); *G01B 11/18* (2013.01); *G01K 11/3206* (2013.01); *G01L 1/242* (2013.01)

(58) Field of Classification Search  
CPC ....... G01J 1/0425; G01L 1/242; G01B 11/18; G01K 11/3206  
See application file for complete search history.

(56) References Cited

U.S. PATENT DOCUMENTS

| | | |
|---|---|---|
| 4,986,671 A | 1/1991 | Sun et al. |
| 5,026,984 A | 6/1991 | Gerdt |
| 5,661,246 A | 8/1997 | Wanser et al. |
| 5,912,457 A | 6/1999 | McQuaid |
| 2004/0035216 A1* | 2/2004 | Morrison et al. ............... 73/800 |

FOREIGN PATENT DOCUMENTS

WO 2009/087371 7/2009

* cited by examiner

*Primary Examiner* — Mark R Gaworecki  
(74) *Attorney, Agent, or Firm* — Chamberlain Hrdlicka

(57) ABSTRACT

A cable for monitoring a tubular structure. The cable comprising a fiber optic bundle arranged for simultaneously sensing a plurality of parameters along a length of the tubular structure that the cable is interfaced with.

18 Claims, 1 Drawing Sheet

FIBER-OPTIC MONITORING CABLE

CROSS-REFERENCE TO RELATED APPLICATIONS

Not applicable.

TECHNICAL FIELD

The present invention generally relates to subsea asset monitoring and in particular, but not by way of limitation to a composite monitoring fiber optic cable for monitoring subsea assets, such as subsea tubular structures: umbilicals, risers (including rigid, semi-rigid and flexible risers), flowlines, and offload lines.

BACKGROUND OF THE INVENTION

In the oil and gas industry there are certain installations in which various connections and conduits are necessary. In the subsea domain, for example, subsea hydrocarbon production systems using sea surface facilities of any sort require petroleum fluids to flow from the seabed to the surface through various connections and conduits. Such connections and conduits, also referred to herein as tubular structures or pipe structures, may include any combination of rigid, semi-flexible or flexible risers, flowlines, flexible pipes and umbilicals.

Due to the various forces acting on these tubular structures, for example as the sea surface rises and falls with waves and tides and the facilities are moved vertically, laterally and rotationally, such structures are subject to structural failure due to fatigue. Additional damage may occur in the form of corrosion, erosion, or blockage which can be caused by the interior deposition of one or more of the flow components (such as wax, hydrates, asphaltenes, scales, etc.).

In the surface operating domain, whether onshore or offshore for example, pipe structures may experience structural failure due to periodic installation and disassembly, or jarring from high pressure fluid flow.

Accordingly, there is a need to monitor the condition of such pipe structures for effective operation so that remedial measures may be taken before such structural failure occurs.

WO2009087371 discloses a monitoring system for use in floating production installations such as those used in offshore oil and gas production. The disclosure teaches a continuous optical fiber distributed sensor installed as part of a flexible (or partially flexible) pipeline, wherein the sensor provides a distributed measurement of temperature and/or strain.

SUMMARY OF THE INVENTION

According to a first aspect of the invention there is provided a cable for monitoring tubular structures including subsea pipelines, umbilicals, risers and flowlines. The cable may comprise a fiber optic bundle arranged for simultaneously (or near simultaneously) sensing temperature, vibration and strain along a length of the monitored structure in which the cable is interfaced. Such cable may be used to provide distributed measurements (for example, using OTDR techniques) and discrete, localized measurements (for example, using FBG techniques).

According to a further aspect of the invention the cable may comprise: a housing encapsulating a central fiber optic bundle and a first and a second tube; the central fiber optic bundle extends axially along a central-axis of the cable in between the first and the second tube extending axially and substantially adjacent to a respective side of the cable. The first and second tubes preferably have a fiber optic sensor located in each.

According to yet a further aspect of the invention the cable may comprise a central tube having a loosely-fitted fiber optic; a fiber optic bundle stranded around and fixedly-fitted to an outside surface of the central tube; and a housing that surrounds both the central tube and the fiber optic bundle so as to form a substantially circular cross-section.

According to another aspect of the invention there is provided a cable for monitoring a tubular structure, the cable may comprise: a first and a second tube, each of the tubes having a loosely-fitted fiber optic located therein and a fiber optic bundle fixedly connected around an outside surface of each tube; and a housing for surrounding both the first and the second tubes, the housing having a surface shaped to fit substantially flush with the monitored asset.

Still other aspects, features, and advantages of the present invention are readily apparent from the entire description thereof, including the figures, which illustrates a number of exemplary embodiments and implementations. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which.

DETAILED DESCRIPTION

Figure 1:
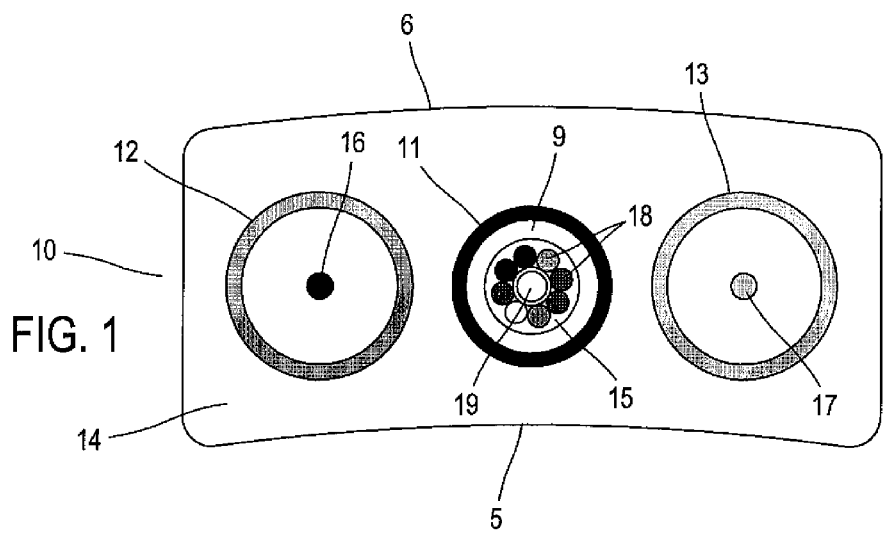
FIG. 1 shows a substantially flat cable arrangement according to an embodiment of the invention.

Subsea Umbilical, Risers and Flowlines (SURF) are used for communication, control, power and fluid conveyance in the production of hydrocarbons from beneath the seabed. Embodiments of the invention are concerned with fiber optic based monitoring cables for operational and integrity management of SURF assets, but may be expanded to include monitoring of a variety of onshore and offshore pipe structures as will be understood by those skilled in the art. For purposes of conciseness, however, embodiments of the present invention will primarily be described as related to monitoring SURF assets.

One example of a SURF asset includes the umbilical. Umbilicals are typically complex pipe structures which may include electrical, optical and hydraulic pipes or cables which allow for power, data communication, control and fluid injection between the surface and the various subsea installations.

Another example of a SURF asset includes the riser and flowline. Risers and flowlines typically also use complex pipe structures primarily for carrying hydrocarbons in a subsea environment. Flexible risers for example often operate in harsh conditions where environmental loading can cause fatigue and thus it is desirable to having a strain sensing system in place. Many different types of risers and flowlines may be used including flexible, semi-rigid or rigid risers and flowlines. For example rigid flowlines are often times used, which for example take the form of an inner metallic pipe surrounded by an insulating polymer layer, which in turn might also be coated with cement.

Monitoring SURF assets, which are typically long slender structures, often requires measurements at regular intervals along the complete length or partial length of the structure. The monitoring systems are typically tied-back to the surface production platform, enabling real-time access to the monitoring data, or remotely located for periodic retrieval of the monitoring data.

The cable, or cables, conceived by the present invention is preferably equipped with fiber optic sensors for monitoring strain, temperature and acoustic vibration along the length, or a portion of the length, of the SURF structure. The cables effectively bundle comprehensive monitoring capability within a single package and simplify installation of these systems in SURF assets. The cable shape is readily manufactured for ease of integration with the SURF structure. The monitoring cable may be either embedded within the SURF asset or externally attached.

Fiber optic sensing technologies to be used include discrete, point measurements along an array of Fiber Bragg Gratings (FBG) and distributed measurements based on numerous optical time domain reflectometry (OTDR) techniques (e.g. Rayleigh, Brillouin, Raman and coherent Rayleigh).

Fiber Bragg Gratings (FBG), a well established technology, reflects particular wavelengths of light, while transmitting others, which is achieved by adding a periodic variation to the refractive index of the fiber core. Fiber Bragg gratings can be used for localized/semi-distributed strain measurement, acting as direct strain gauges. A large number of gratings can be multiplexed on a single optical fiber. Several systems for interrogating FBGs have been proposed, and will be well know to the person skilled in the art. Based on current technology, it is believed to be possible to interrogate up to a few hundred FBG sensors on a single optical fiber. Typical measurement time is around 1 s.

Optical time domain reflectometry (OTDR) is a well-known technique for measuring the distribution of a number of parameters of an optical fiber, such as attenuation, core diameter, numerical aperture, and even chromatic dispersion. When a narrow-band source is used in an optical time domain reflectometer to interrogate an optical fiber for example, Rayleigh backscattered light is produced in response to an interrogating pulse launched into the fiber. In essence, the interrogating pulse can be thought of as occupying a certain length of the fiber and, assuming that the pulse is coherent, all the electric dipoles arising from the non-homogeneity of the glass have a fixed (though random) phase relationship to one another. The resulting backscatter signal for a particular section of the fiber is then treated as the coherent sum of all the electric fields of these dipoles. This sum is, of course, dependent on the phase as well as the amplitudes of each dipole. For a fixed optical source frequency and a fixed state of the fiber (i.e., a fixed temperature, strain, etc.), the backscatter return (relative to the pulse energy) from a particular location is fixed, but randomly related to the backscatter return from any other section of fiber.

Application of these sensing technologies on SURF structures preferably includes robust interface packaging of the fiber optic while simultaneously ensuring integrity of the sensor measurement. Traditionally, FBG-based SURF monitoring systems have embedded the fiber optic sensor package within clamps, collars, strips and rods. Distributed fiber optic measurements are less established with SURF applications and more commonly deployed in downhole (subsurface) temperature measurement where stainless steel tubing provides the main structural protection. Temperature monitoring of flowlines and ancillary thermal management systems is an emerging application where the fiber optic is also deployed in a stainless steel tube.

The basic parameters to be preferably measured include: strain, temperature and acoustic vibration. Traditionally, the data acquired from these separate sensors is processed and interpreted for conditions that provide valuable information for operational and integrity management of SURF assets. Examples include: tensile and compressive loading, bending and buckling, feedback for flow assurance operations (thermal monitoring, liquid slugs, sand production, leaks), alarms for classified thresholds, correlation of in-service performance with design predictions and ongoing integrity assessments with in-service measurement data.

Strain sensing requires that the fiber optic is closely coupled to the structural deformation of the SURF asset. Temperature and acoustic measurements can also be performed with strain-coupled fiber optics, provided a strain-insensitive measurement technique is used. For example, Raman-based OTDR provides a strain-insensitive temperature measurement. Temperature and acoustic measurement can also be acquired from strain-free fiber optic in loose filled tubes.

Fiber optic based OTDR and FBG sensors are well suited for monitoring the complete, or partial, length of SURF assets. Thus, according to a preferred embodiment of the invention, the various distributed optical fiber sensors are bundled into a single package for interfacing with the monitored SURF asset. Specifically, the package may be a cable having a bundle of various fiber optic sensor arrangements, which easily attach to and interfaces with the SURF asset for monitoring. Because the various sensor arrangements are all bundled into a single cable arrangement, the package is able to simultaneously perform strain, temperature and acoustic monitoring of the SURF asset. It should be appreciated for example, that the different sensory sub-assemblies within the package may utilize FBG and OTDR technologies.

FIG. 1 shows a cross-sectional view of a monitoring cable 10 according to an embodiment of the present invention. Shown therein, a strain sensing fiber optic assembly 11 packaged in a central tube and substantially aligned along a central-axis member 19 of the cable 10. The strain sensing fiber optic assembly 11 comprises a bundle of fibers 18 closely wrapped together around the central-axis member 19. In the embodiment of FIG. 1, eight (8) fibers 18 are shown arranged around the central-axis member 19. However, any number of fibers 18 may be arranged around the central-axis member so as to provide a useful strain measurement. The strain sensing fiber optic assembly 11 of the present embodiment is shown to further comprise a layer 15 made of a gel, such as silicone, that surrounds the bundle of fibers 18 as a protective layer between the fibers 18 and the central-axis member 19. An additional layer 9 may be positioned between layer 15 and the outer diameter of the central tube of the strain sensing fiber optic assembly 11.

The monitoring cable further comprises respective a distributed temperature fiber optic sensor 16 and an acoustic vibration fiber optic sensor 17 located inside tubes 12 and 13 on either side of the strain sensing fiber optic assembly 11, and near the sides of the monitoring cable 10. The tubes 12 and 13 may be made of a metallic material such as stainless steel or Inconel and may be designed to add strength to the cable 10 for withstanding a certain amount of tension placed on the SURF asset. The strain sensing fiber optic assembly 11 and tubes 12 and 13 are preferably encapsulated within a housing made of a thermoplastic material 14, such as polyethylene, to protect the cable 10 from environmental damage. Many different thermoplastic materials could be used provided that the cable 10 can withstand the harsh environmental conditions. The encapsulation is typically made using well-known techniques such as pressure extrusion so that the thermoplastic material can fill substantially all available space 14 between the tubes 12, 13 and the strain sensing fiber optic assembly 11.

The fiber optics used (i.e. 16, 17 and 18) may be any suitable fiber optics for sensing temperature, vibration and strain, respectively. In the embodiment of FIG. 1, fibers 18 can be of the single or multimode type and are preferably designed to sense strain along the length of the cable. Fiber 16 can be of the single or multimode type and is preferably designed to sense temperature along the length of the cable 10. Likewise fiber 17 can be of the single or multimode type and is preferably designed to sense vibration along the cable 10.

The monitoring cable 10 preferably has a generally rectangular cross section with flat or slightly curved sides 5 and 6 that sit substantially flush when held firmly against a component surface of the SURF asset, e.g. pipe, tube, sheath or flat-sided armor wires. The flush interface preferably increases measurement accuracy by allowing for effective strain, temperature and vibration transfer to the monitoring cable 10, and thus the fibers 16, 17 and 18 located within the cable 10.

The cable 10 can either be firmly sandwiched within a multilayer SURF construction, or attached such as for example by strapping it or bonding it to the external surface of SURF asset. The flat or slightly curved sides 5 and 6 of the cable facilitate interfacing the cable with SURF constructions. Two or more runs of the cable 10 could be used along the SURF asset to increase the level of contingency or redundancy of the encapsulated fiber optic sensors. Moreover, by using three or more runs as for example separated by 120 or 90 deg can allow the bending or buckling events to be resolved in two planes.

Figure 2:
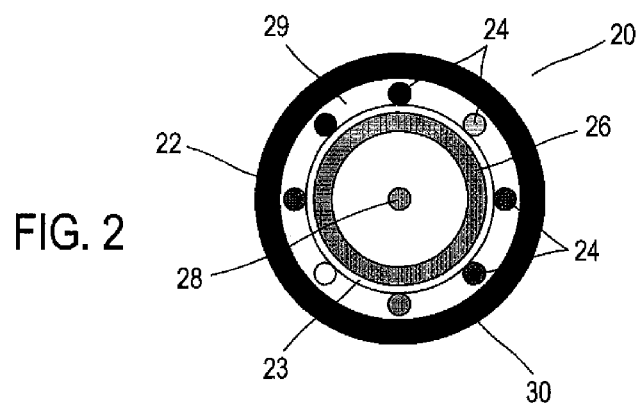
FIG. 2 shows a circular cable arrangement according to an alternative embodiment of the invention.

FIG. 2 shows a cross-sectional view of a monitoring cable 20 according to another embodiment of the present invention. In this embodiment, the cable 20 is shown to have a substantially circular shape. The cable 20 is configured to be preferably helically stranded around or within a SURF structure, or installed along the central axis of a SURF asset, such as an umbilical. The external surface of the cable should be circumferentially supported against adjacent components within the SURF structure for effective strain coupling. These supporting components may, for example, include shaped void fillers in the case of umbilical.

Monitoring cable 20 may comprise a central tube 26 made preferably from a metallic material for providing strength. A loose-fit fiber optic 28 is located therein for performing temperature and/or acoustic monitoring. Alternatively, instead of a single optical fiber 28, two optical fibers (not shown) could be used: one for performing temperature and one for performing acoustic monitoring. As previously mentioned in brief, the tube 26 may also act as a strength member for handling operations before it is embedded within a SURF structure. An additional layer 23 made of metallic material may be disposed around the tube 26 to impart additional tensile strength.

Fiber optics 24 may be helically stranded around, and anchored to, the outside of the tube 26 for strain measurement. The embodiment of FIG. 2 can include strain-coupled optical fibers 24 as well as strain-free optical fiber(s) 28. The optical fibers 24 are preferably encapsulated by a layer 29 made of silicone or the like for protection. Optionally a tight-buffer jacketing (not shown) made preferably of thermoplastic material may surround each fiber 24. The cable 20 is preferably jacketed with a thermoplastic housing material 30, which may further have optional metallic or non-metallic stranded armoring.

Figure 3:
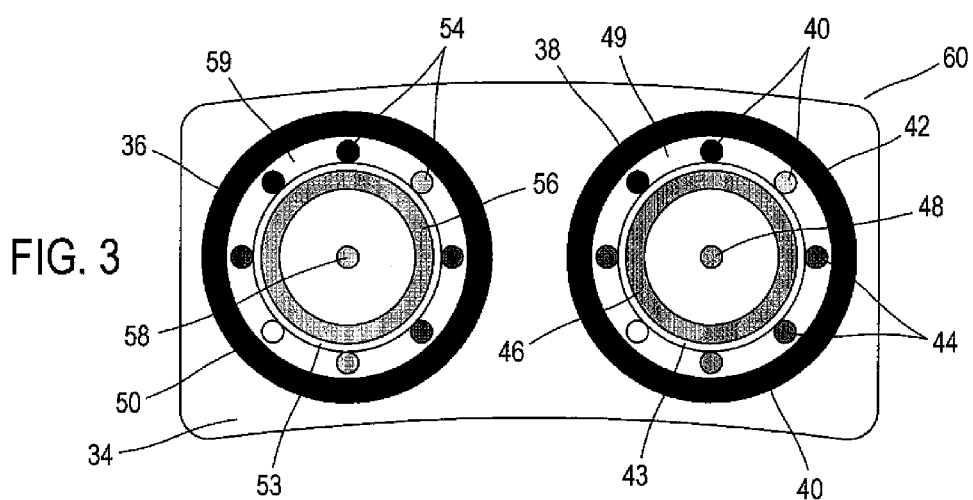
FIG. 3 shows a substantially flat cable arrangement according to yet another embodiment of the invention.

FIG. 3 shows a cross-sectional view of a cable 60 according to yet another embodiment of the present invention, which combines certain features from the cables 10 and 20 shown in FIGS. 1 and 2, respectively. In general, the cable 60 comprises at least one of the cable 20 of FIG. 2 embedded within a flat housing similar to that of FIG. 1. Such arrangement potentially increases measurement accuracy by obtaining the flush-fit shape with, or external to, the SURF asset.

In one implementation of the embodiment shown in FIG. 3, a fiber optic bundle 36 can provide temperature and strain monitoring while another fiber optic bundle 38 can provide vibration and strain monitoring. Alternatively, in another implementation of the embodiment shown in FIG. 3, the fiber optic bundles 36 and 38 within the cable 60 may provide the exact same monitoring for contingency or redundancy purposes.

Tubes 48 and 56, within each bundle 38 and 36, are preferably made of a metallic material for providing tensile strength. The tubes 48 and 56 of each bundle arrangement 38 and 36 may accommodate loose-filled fiber optics 46 and 58 for strain-free temperature and/or acoustic sensing. An outer layer of helically stranded optical fibers 40 and 54 of each arrangement 38 and 36, are preferably strain coupled to the tubes 48 and 56 for strain measurement.

The cable 60 is preferably encapsulated with a thermoplastic material (e.g. polyethylene) that is compatible with the environment, and protects the bundles 36 and 38 from damage. The encapsulation may be pressure extruded so that thermoplastic fills all available space within the cross-section. The cable 60 may incorporate all types of fiber-optic based FBG and OTDR sensing systems applicable to SURF assets. The cable 60 can either be firmly sandwiched within a multilayer SURF structure or attached (e.g. strapped or bonded) to the external surface (not shown). The flat or slightly curved sides of the cable facilitate interfacing the cable with SURF structure. Two or more runs of the cable along the SURF asset may further increase the level of contingency or redundancy of the encapsulated fiber optic sensors. Three or more runs (e.g. separated by 120 or 90 deg) allow the bending or buckling events to be resolved is two planes.

While the present invention has been described in connection with a number of exemplary embodiments, and implementations, the present invention is not so limited, but rather covers various modifications, and equivalent arrangements, which fall within the purview of the appended claims.

What is claimed is:

1. A cable for monitoring a tubular structure, the cable comprising a fiber optic bundle arranged for simultaneously sensing a plurality of parameters along a length of the tubular structure that the cable is interfaced with, wherein the cable is interfaced with an asset to be monitored by positioning the cable on, and helically stranded around, a length of the asset to be monitored.

2. The cable of claim 1, wherein the fiber optic bundle uses both OTDR and FBG techniques for sensing the plurality of parameters.

3. The cable of claim 1, wherein the cable is interfaced with the monitored asset by positioning the cable on the length of the asset to be monitored.

4. The cable of claim 1, wherein the cable is for sensing strain, temperature and acoustic vibration along the length of the asset to be monitored.

5. The cable of claim 1, wherein the tubular structure is a subsea umbilical, riser or flowline (SURF asset).

6. The cable of claim 1, wherein the cable is encapsulated within a thermoplastic housing.

7. A cable for monitoring a tubular structure, the cable comprising:
   a housing encapsulating a central fiber optic bundle and a first and a second tube;
   the central fiber optic bundle extending axially along a central-axis of the cable in between the first and the second tube that each extend axially substantially adjacent a respective side of the cable, and wherein the tubes each having a fiber optic sensor located therein.

8. The cable of claim 7, wherein a surface of the housing is shaped for enabling a flush connection with an asset to be monitored.

9. The cable of claim 8, wherein the housing is substantially rectangular shaped and the surface for enabling the flush connection having a substantially flat or slightly curved shape.

10. The cable of claim 7, wherein the first tube includes a temperature fiber optic sensor and the second tube having an acoustic fiber optic sensor.

11. A cable for monitoring a subsea pipeline, the cable comprising:
    a central tube having a loosely-fitted fiber optic;
    a fiber optic bundle stranded around and fixedly-fitted to an outside surface of the central tube; and
    a housing that surrounds both the central tube and fiber optic bundle and having a circular cross-section.

12. The cable of claim 11, wherein an adhesive compound fills a space between the stranded fiber optic bundle and the housing.

13. The cable of claim 12, wherein there is further added a tight-buffer jacketing on each fiber of the optical fiber bundle.

14. The cable of claim 11, wherein the housing is a thermoplastic.

15. The cable of claim 14, wherein the housing is jacketed with a stranded armouring.

16. A cable for monitoring a tubular structure, the cable comprising:
    a first and a second tube, each of the tubes having a loosely-fitted fiber optic located therein and a fiber optic bundle fixedly connected around an outside surface of each tube; and
    a housing for surrounding both the first and the second tubes, the housing having a surface shaped to fit flush with the subsea pipeline.

17. The cable of claim 16, wherein the loosely-fitted fiber optic is capable of strain-free sensing of at least one of temperature and acoustic.

18. The cable of claim 16, wherein the tubes are metallic.

* * * * *